March 18, 1969 T. E. G. GARDINER ET AL 3,433,244
VARIABLE AREA DUCT
Filed April 20, 1967
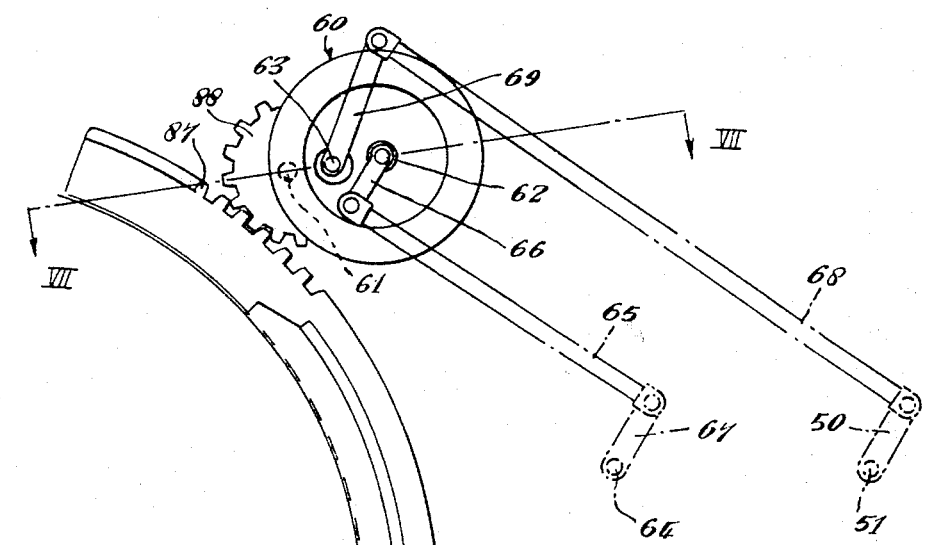
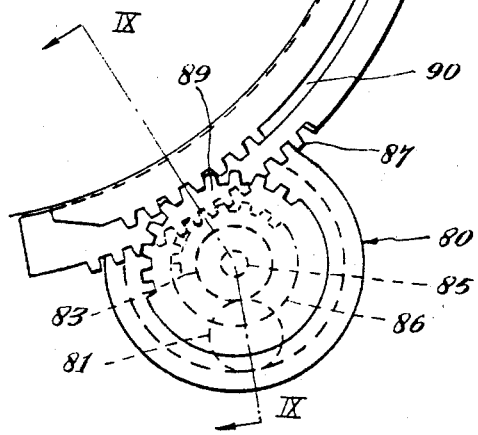
Fig.6.

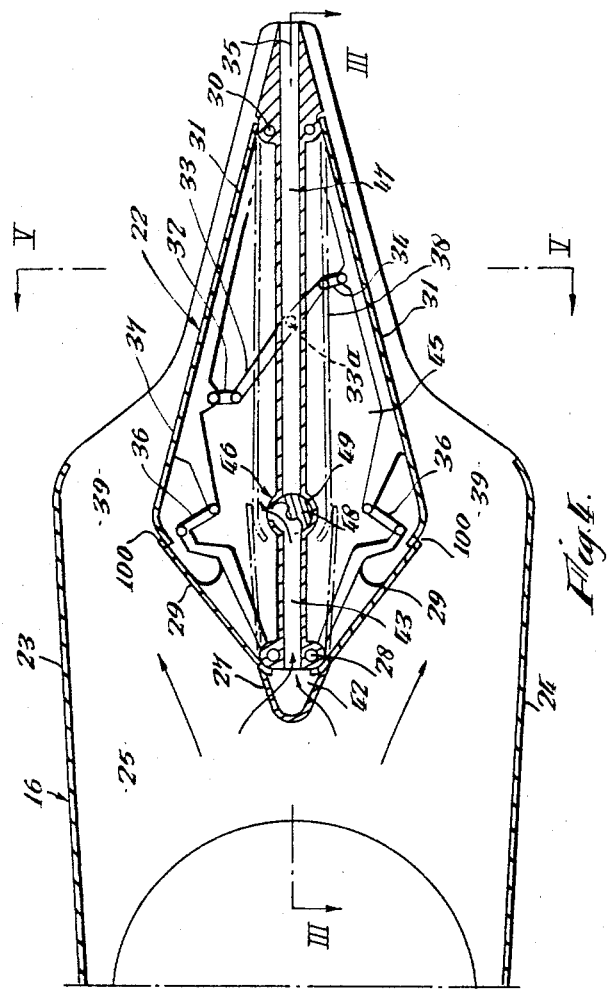
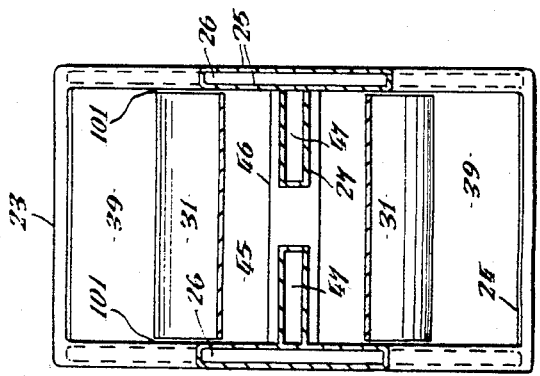

United States Patent Office 3,433,244
Patented Mar. 18, 1969

3,433,244
VARIABLE AREA DUCT
Terence Edward Gouvenot Gardiner and John Rodney Dyson Fuller, London, England, assignors to Bristol Siddeley Engines Limited, London, England, a British company
Filed Apr. 20, 1967, Ser. No. 632,368
Claims priority, application Great Britain, Apr. 21, 1966, 17,439/66
U.S. Cl. 137—221                                5 Claims
Int. Cl. F16k 7/00, 13/00, 45/00

ABSTRACT OF THE DISCLOSURE

The disclosure of this invention pertains to a jet propulsion nozzle whose flow area is varied by a dilatable body comprising hinged walls by means of which the body can be dilated. The dilation is controlled by air pressure acting on the walls at the interior of the body. The admission and discharge of the air is controlled by a valve situated within the body.

---

Figure 1:
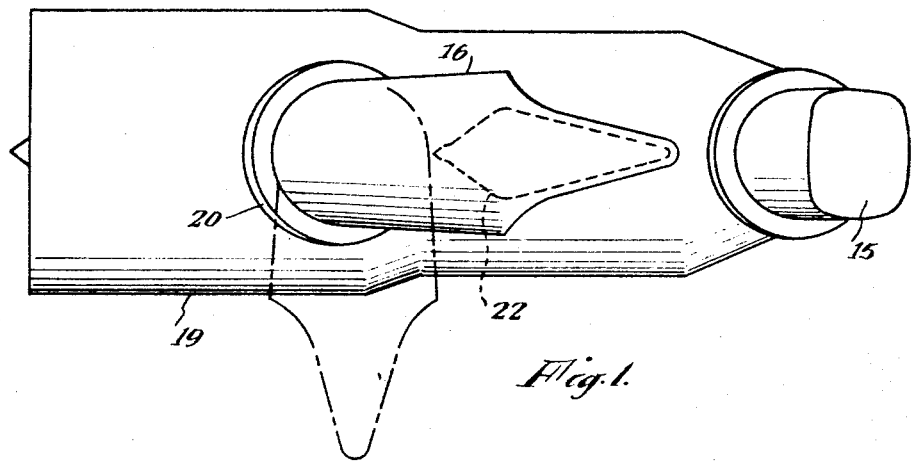

This invention relates to variable area ducts for fluids. It is known to provide a fluid flow duct with walls which are movable transversely to the direction of flow so as to vary the flow area of the duct.

It is a disadvantage of the such known ducts that it is difficult to control the position of the movable walls over widely varying pressures exerted on them by the fluid flow through the duct. To overcome this difficulty it has been found necessary in the past to use high pressure hydraulic motors connected to the members through mechanical transmitting means such as gears or links. However, it is sometimes inconvenient or dangerous to use high pressure hydraulic systems, for example in conditions of high temperature such as are found around the exhaust nozzle of a jet engine.

If such a nozzle is arranged to be pivoted relative to a stationary part of the engine, there is the additional difficulty of transmitting the hydraulic fluid between the stationary and the pivoted parts as this increases the danger of leakage and of fire.

The object of the present invention is to overcome these difficulties.

According to this invention there is provided a variable area duct comprising first and second flow-directing walls, a hollow body, the second walls constituting partitions between the interiors of the body and the duct, the second walls being hingedly movable relative to the first walls to vary the flow area of the duct; characterised by an inlet passage for a pressurised operating fluid to the interior of the body, an outlet passage for the operating fluid from the interior of the body, and valve means connected between said passages and the interior of the body and operable progressively between a position wherein the interior of the body is connected to the inlet passage to expose the second walls to the pressure of the operating fluid and a position wherein the interior of the body is connected to the outlet passage for discharge of the operating fluid, all whereby to control the position of the second walls and thus the flow area of the duct.

It will be seen that by causing the operating fluid to act directly on the movable walls, the need for separate motors is avoided. Also, in view of the relatively large surfaces presented by the movable walls, it is possible to use an operating fluid of relatively low pressure so that, in some cases, the operating fluid can be taken from the same source as the fluid flowing through the duct.

It is also an object of the invention to make possible a very short distance between the valve means controlling the operating fluid and the surfaces of the movable walls against which the fluid acts. To this end the valve means may include a valve situated within the body and arranged to supply the working fluid directly thereinto. This makes possible a good control of the position of the movable walls, especially if the operating fluid is a gas.

Figure 2:
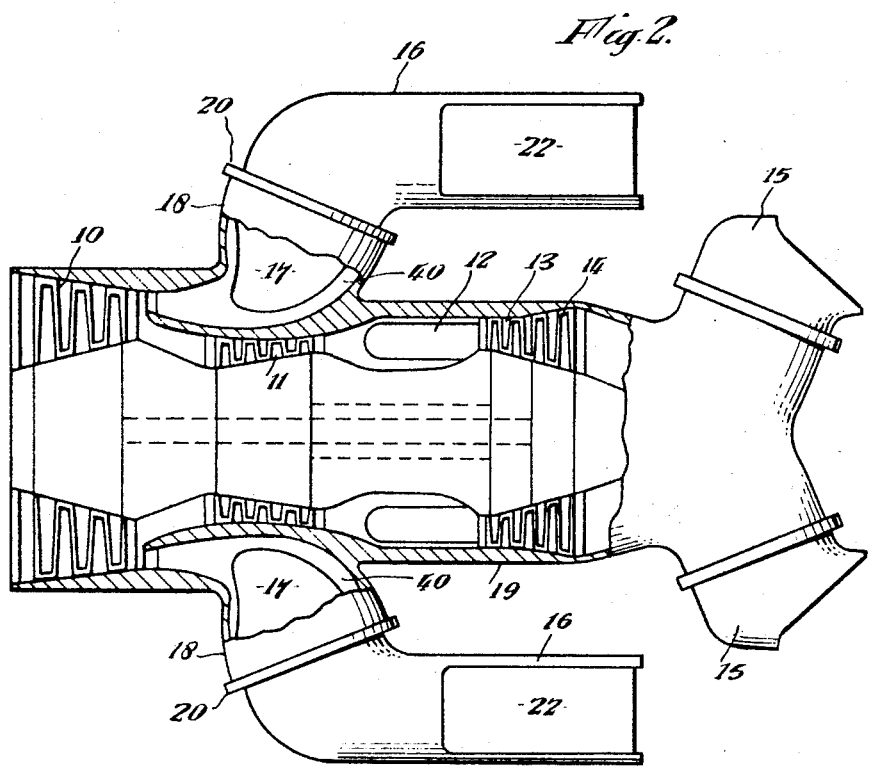
Figure 3:
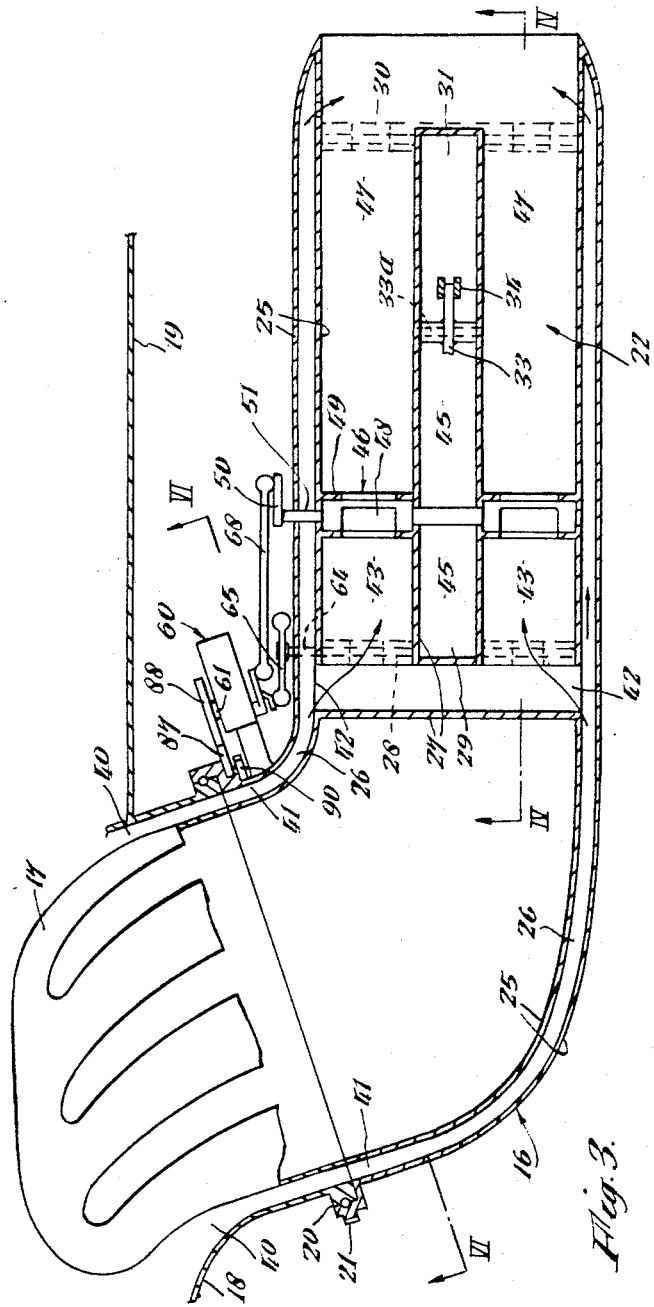
Figure 7:
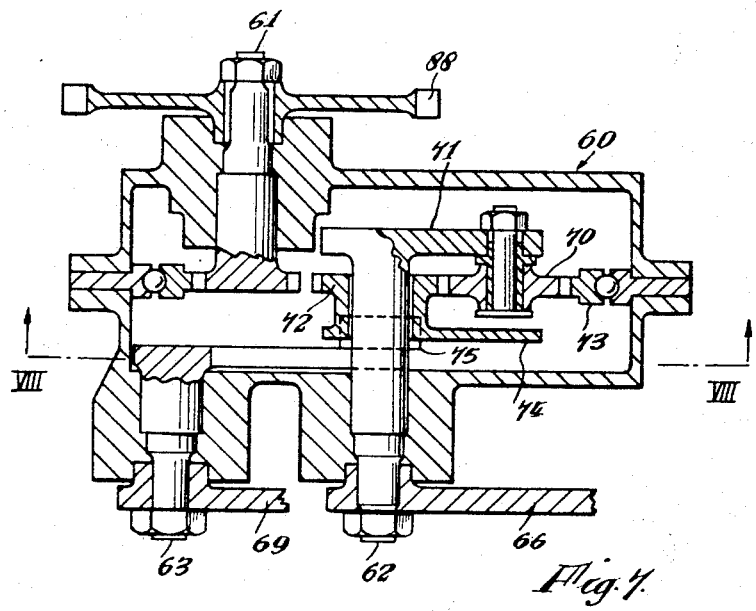
Figure 8:
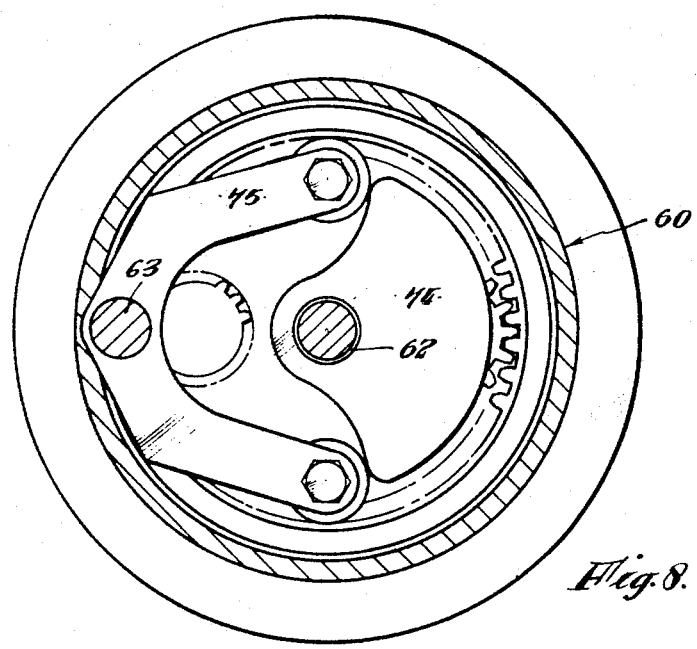
Figure 9:
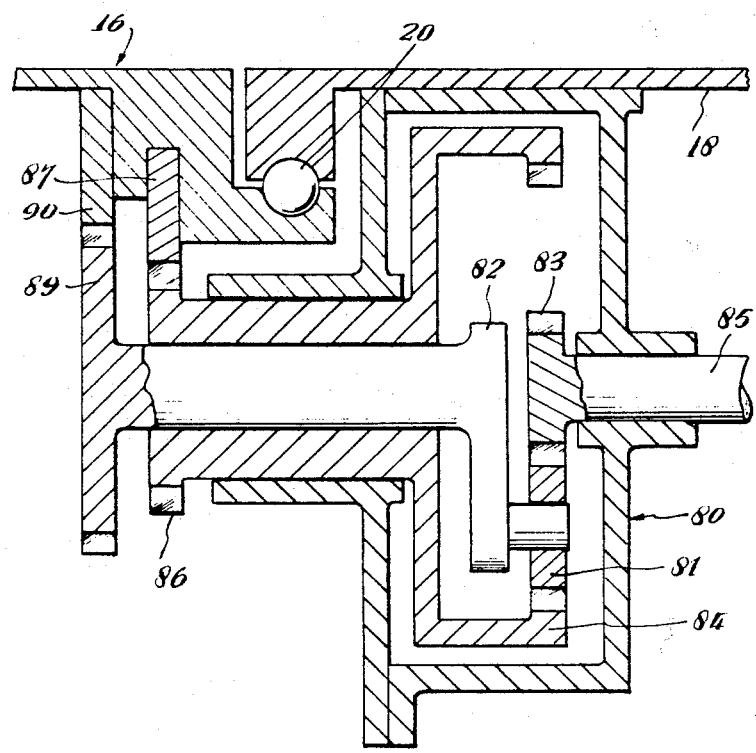

One form of apparatus according to this invention will now be described with reference to the accompanying drawings wherein:

FIG. 1 is an elevation of an engine, embodying the device.
FIG. 2 is a plan view of FIG. 1, partly in section.
FIG. 3 is an enlarged view of a part of FIG. 2 showing further sectioned detail.
FIG. 4 is a section on the line IV—IV in FIG. 3.
FIG. 5 is a section on the line V—V in FIG. 4.
FIG. 6 is a section on the line VI—VI in FIG. 4.
FIG. 7 is a section on the line VII—VII in FIG. 6.
FIG. 8 is a section on the line VIII—VIII in FIG. 7.
FIG. 9 is a section on the line IX—IX in FIG. 6.

The engine comprises (FIGS. 1, 2) a low pressure compressor 10 followed by a high pressure compressor 11 supplying a combustor 12 exhausting through turbines 13, 14 connected to drive the respective compressors. The turbines 13, 14 exhaust through ducts or nozzles 15. A part of the output of the compressor 10 is passed through ducts or nozzles 16 emanating from a chamber 18 containing combustors 17. The nozzles 15, 16 are adapted to be pivoted for the thrust therefrom to be diverted, e.g., for the purpose of vertical take-off of an aircraft in which the engine is installed. Means for pivoting the nozzles are known and are not described herein except for saying that each nozzle is supported on the body of the engine by a bearing 20 and is provided with a gear 21 (FIG. 3) whereby to be pivoted about the axis of the bearing 20.

The nozzles 16 are each provided with a dilatable centre body 22 (FIGS. 3, 4, 5) for the purpose of varying the cross-sectional area of the nozzle having regard to varying conditions of flight particularly whether or not the combustors 17 are used.

The cross-section of each nozzle 16 changes gradually from the circular shape required by the bearing 20 to an approximately rectangular shape required by the centre body 22. The rectangular part of the nozzle comprises upper and lower walls 23, 24 and at each side a double wall 25 defining a cavity 26. Medially between the upper and the lower walls, the walls 25 are secured together by a bridge member 27 pivotally supporting at pins 28 a pair of front walls or leaves 29 and at pins 30 a pair of rear walls or leaves 31. The two rear leaves 31 are connected together by links 32, 33, 34 of which the link 33 is pivoted to the member 27 at 33a. The links 32, 33, 34 are so arranged that if one of the leaves 31 pivots about its associated pin 30 the other leaf 31 must so follow that the disposition of the two leaves remains substantially symmetrical about the axis, denoted 35, of the nozzle. Each front leaf 29 is connected to the adjacent rear leaf 31 by a link 36 so arranged that the front leaf must follow the rear leaf for them to move jointly between expanded and contracted positions 37 and 38 respectively. It will be seen that the movement of the leaves 29, 31 causes a corresponding variation of the cross-sectional outlet area, denoted 39 (FIGS. 4, 5), of the nozzle 16. Any one setting of the leaves is also referred to as the degree of dilation of the centre body.

The movement of the leaves 29, 31 is effected by air pressure supplied by the low pressure compressor 10. As shown in FIG. 3, a part of the air entering the chamber 18 by-passes the combustor 17 at passages 40 and passes through a passage 41 into the cavities 26 of the hollow side walls 25 of the nozzle. Ports 42 allow at least a part of the air to enter an inlet passage 43. Between the walls 25 and interiorly of the leaves 29, 31 there is defined a space 45 connectable by means of a valve 46 either to the inlet passage 43 or to an outlet passage 47 leading to atmosphere. When the space 45 is connected to the inlet passage the air pressure therein operates to dilate the leaves 29, 31 in opposition to the nozzle pressure, i.e., the gas pressure in the vicinity of the outlet area 39 of the nozzle. When the space 45 is connected to atmosphere the nozzle pressure operates to contract the leaves 29, 31. The valve 46 comprises a valve member 48 rotatable within a housing 49 by means of a lever 50 (FIGS. 3, 6) secured to a shaft 51 on which the valve member is mounted, FIGS. 3, 6 show the valve member and lever in the position fully exposing the space 45 to the air pressure in the passage 43 and thus leading to the greatest possible rate of dilation of the leaves 29, 31. Clockwise rotation of the shaft 51 gradually closes the connection to the passage 43 until that connection is cut off. Continued clockwise rotation then gradually opens the space 45 to atmosphere. Reverse movement of the lever has the reverse effect.

The degree of dilation of the centre body is regulated by a closed loop control unit 60 (FIGS. 6 to 8) mounted on the nozzle and comprising an epicyclic gearing having a demand input shaft 61, a feedback input shaft 62 and an error output shaft 63. The demand signal comes from a source remote from the nozzle 16 and its transmission to the unit 60 is described later hereinbelow. The feedback signal is taken from a shaft 64 (FIGS. 3, 6) being an extension of one of the pins 28, the pin being secured to its associated leaf 29 so as to rotate the shaft 64 in accordance with any angular motion of the leaf 29 and thus in accordance with the degree of dilation of the centre body. Rotation of the shaft 64 is transmitted to the shaft 62 by means of a link 65 connecting levers 66 and 67 secured to the shafts 62 and 64, respectively. The error signal is transmitted from the shaft 63 to the shaft 51 of the valve 46 by means of a link 68 connecting the lever 50 to a lever 69 secured to the shaft 63.

In the unit 60 a planet gear 70 supported by a carrier 71 meshes with a sun gear 72 and an annulus gear 73. The carrier 71 and annulus 73 are drivingly connected to the feedback shaft 62 and the demand shaft 61, respectively, so that the rotational position of the sun gear 72 is directly proportional to the difference between feedback and demand. The sun gear 72 has secured thereto a cam 74 driving a pair of follower arms 75 secured to the error output shaft 63. The cam 74 is shaped to modify the error signal at the gear 72 in order to produce the maximum rotation of the valve 46 for a small error and to avoid over-rotation for large errors.

It will be noted that all the elements of the closed loop control, i.e., the unit 60 and its connections to the shafts 51, 64, are contained on the nozzle 16 and participate in the pivotal motion thereof.

The demand signal is transmitted to the unit 60 through a gearbox 80 (FIGS. 6, 9) mounted on the chamber 18 and including a planet gear 81 which is supported on a carrier 82 and meshes with a sun gear 83 and an annulus gear 84. The sun gear 83 is secured to a demand input shaft 85 and the annulus 84 is drivingly connected by a gear 86 to a gear segment 87 which is supported on the nozzle 16 for movement relative thereto about the axis of the bearing 20 and which meshes with a gear 88 secured to the shaft 61 of the unit 60 (FIGS. 6, 7) all whereby rotation of the shaft 85 is transmitted to the shaft 61. The carrier 82 is connected through a gear 89 to a gear segment 90 secured to the nozzle 16 concentric with the bearing 20 so that rotation of the nozzle does not affect the demand setting of the shaft 61. It will be appreciated that when the nozzle is rotated the segment 87 must travel together with the nozzle to prevent unwanted rotation of the gear 88 and shaft 61. The segment 90 and gear 89 ensure that, when the nozzle rotates, rotation is imparted to the gear 84 independently of the input shaft 85 and the segment 87 is moved together with the nozzle.

The demand input shaft 85 is connected to a pilot's control lever for actuation thereby.

At their adjacent ends the leaves 29, 31 define between them a sliding joint 100 (FIG. 4) and further sliding joints 101 (FIG. 5) are defined between the leaves 29, 31 and the interior of the walls 25 where engaged by the edges of the leaves. Normally, seals (not shown) are provided at the joints 100, 101 but nevertheless some escape of air is usually unavoidable at such joints. In fact such escape is desirable to ensure circulation of the air through the body for cooling purposes and if the escape at these joints is by itself not enough to provide a cooling effect, holes (not shown) may be provided to allow some of the air from the interior of the body 22 to bleed to atmosphere, e.g., into the passage 47. It will be seen that the control unit 60 operates not only to regulate the supply of air into the body 22 in response to the setting of the input shaft 85 but also to continually replenish the air leaving the body 22 so that the dilation of the body 22 is maintained in accordance with the demand as represented by the angular position of the shaft 85.

The mounting of the closed loop control unit 60 ensures that the error and feed back signals have a short and direct route to the body 22, i.e., do not have to be transmitted from the pivotal nozzle to the stationary engine body, and are therefore not affected by pivotal motion of the nozzle. This merely leaves the demand signal to be transmitted between the stationary body and pivotal nozzle, and this is done by the shafts 85, 61, which constitute first and second operating members for setting the demand. As described, the transmission between the shafts 85, 61 is such that the demand setting of the shaft 61 is not affected by the pivotal motion of the nozzle.

What we claim is:

1. A fluid flow duct comprising first and second flow-directing walls, a hollow body, the second walls constituting partitions between the interiors of the body and the duct, the second walls being hingedly movable relative to the first walls to vary the flow area of the duct; characterised by an inlet passage for a pressurised operating fluid to the interior of the body, an outlet passage for the operating fluid from the interior of the body, and valve means connected between said passages and the interior of the body and operable progressively between a position wherein the interior of the body is connected to the inlet passage to expose the second walls to the pressure of the operating fluid and a position wherein the interior of the body is connected to the outlet passage for discharge of the operating fluid therefrom, all whereby to control the position of the second walls and thus the flow area of the duct.

2. A fluid flow duct, according to claim 1, wherein the body extends across the duct so as to divide flow through the duct into two streams, the first walls including two parallel side walls, the second walls extending between the parallel walls and being pivotal about axes at right angles thereto; and wherein the valve means comprise a valve housing extending within the body, a control port in the housing open to the interior of the body, and a valve member movable between a position connecting the port to the inlet passage and a position connecting the port to the outlet passage.

3. A fluid flow duct according to claim 2, comprising an inlet port and an outlet port provided in the valve housing, an inlet port provided in at least one of the side walls, said inlet passage being provided within the body between the inlet ports of the side wall and the valve housing, said outlet passage being connected to the outlet port, and the valve member being movable between positions respectively connecting the control port to the inlet port and the outlet port of the housing.

4. A fluid flow duct according to claim 3, comprising a support member situated within the hollow body and secured to the two side walls in a position therebetween, the support member including the valve housing and at least a part of the inlet and outlet passages.

5. A fluid flow duct according to claim 4, the second walls being hingedly connected to the support member.

References Cited

UNITED STATES PATENTS 3,032,976    5/1962    Theodorsen _____ 251—212 X

M. CARY NELSON, *Primary Examiner.*

M. O. STURM, *Assistant Examiner.*

U.S. Cl. X.R.

137—601